United States Patent
Lubker, II

(10) Patent No.: US 9,656,445 B2
(45) Date of Patent: *May 23, 2017

(54) PROTECTIVE DRAINAGE WRAPS

(75) Inventor: John W. Lubker, II, Roswell, GA (US)

(73) Assignee: Kingspan Insulation LLC, Atlanta, GA (US)

(*) Notice: Subject to any disclaimer, the term of this patent is extended or adjusted under 35 U.S.C. 154(b) by 2111 days.

This patent is subject to a terminal disclaimer.

(21) Appl. No.: 11/367,066

(22) Filed: Mar. 3, 2006

(65) Prior Publication Data

US 2006/0211321 A1 Sep. 21, 2006

Related U.S. Application Data

(60) Continuation-in-part of application No. 10/869,333, filed on Jun. 16, 2004, now Pat. No. 7,196,024, which (Continued)

(51) Int. Cl.
*B32B 3/10* (2006.01)
*B32B 27/12* (2006.01)
(Continued)

(52) U.S. Cl.
CPC ............ *B32B 27/12* (2013.01); *B32B 5/02* (2013.01); *D03D 9/00* (2013.01); *D03D 15/00* (2013.01);
(Continued)

(58) Field of Classification Search
CPC .......... D06N 3/14; D06N 3/125; D06N 3/045; D06N 3/123; D06N 2209/103;
(Continued)

(56) References Cited

U.S. PATENT DOCUMENTS 1,609,937 A 12/1926 Forrest
3,627,620 A * 12/1971 Gasaway .................. 428/76
(Continued)

FOREIGN PATENT DOCUMENTS

EP 0 741 204 A2 11/1996
EP 1 403 036 A 3/2004
(Continued)

OTHER PUBLICATIONS

"The Evolution of Microporous Film" by Leo Cancio, Rick Jezzi and P.C. Wu, Clopay Plastic Products Company—*Nonwovens World* (Oct.-Nov. 2004); 6 pages.

*Primary Examiner* — Elizabeth M Cole
(74) *Attorney, Agent, or Firm* — Harness, Dickey & Pierce, P.L.C.

(57) ABSTRACT

A protective drainage wrap comprises a cross-woven material portion, cross-laminate material portion or mesh material portion in first and second directions and a breathable solid layer portion. The material in the first and second directions comprises a polyolefin, polyester, nylon or combinations thereof. The first direction being roughly perpendicular to the second direction. The cross-woven, cross-laminate or mesh material portions being adapted to facilitate a drainage path. The breathable solid layer portion is attached to the cross-woven material portion, cross-laminate material portion or mesh material portion. The breathable solid layer portion is adapted to allow water vapor to flow therethrough.

27 Claims, 8 Drawing Sheets

Related U.S. Application Data is a division of application No. 10/255,273, filed on Sep. 26, 2002, now Pat. No. 6,869,901, which is a continuation-in-part of application No. 09/788,776, filed on Feb. 20, 2001, now Pat. No. 6,550,212.

(51) Int. Cl.

| | | |
|---|---|---|
| *B32B 5/02* | (2006.01) | |
| *D03D 9/00* | (2006.01) | |
| *D03D 15/00* | (2006.01) | |
| *E04B 1/62* | (2006.01) | |
| *E04B 1/70* | (2006.01) | |
| *E04B 2/70* | (2006.01) | |
| *E04D 12/00* | (2006.01) | |
| *E04F 13/08* | (2006.01) | |
| *D06N 3/12* | (2006.01) | |
| *D06N 3/04* | (2006.01) | |
| *D06N 3/14* | (2006.01) | |

(52) U.S. Cl.
CPC ...... *D03D 15/0083* (2013.01); *D03D 15/0088* (2013.01); *D06N 3/045* (2013.01); *D06N 3/123* (2013.01); *D06N 3/125* (2013.01); *D06N 3/14* (2013.01); *E04B 1/625* (2013.01); *E04B 1/70* (2013.01); *E04B 2/707* (2013.01); *E04D 12/002* (2013.01); *E04F 13/0864* (2013.01); *D06N 2209/103* (2013.01); *D06N 2209/123* (2013.01); *D10B 2321/02* (2013.01); *D10B 2321/021* (2013.01); *D10B 2321/022* (2013.01); *D10B 2331/02* (2013.01); *D10B 2331/04* (2013.01); *D10B 2505/20* (2013.01); *Y10T 442/322* (2015.04)

(58) Field of Classification Search
CPC ............ D06N 2209/123; D03D 9/00; D03D 15/0015; D03D 15/0088; D10B 2505/20; D10B 2331/04; D10B 2331/02; D10B 2321/022; D10B 2321/021; E04D 12/002; B32B 27/12; B32B 5/02; E04B 2/707; E04B 1/70; E04B 1/625; E04F 13/0864; Y10T 442/322
USPC .................. 442/208, 43, 286, 290
See application file for complete search history.

(56) References Cited

U.S. PATENT DOCUMENTS

| | | |
|---|---|---|
| 3,677,874 A | 7/1972 | Sterrett et al. |
| 4,073,998 A | 2/1978 | O'Connor |
| 4,082,882 A | 4/1978 | Weinstein et al. |
| 4,088,805 A | 5/1978 | Wiegand |
| 4,114,335 A | 9/1978 | Carroll |
| 4,147,004 A | 4/1979 | Day et al. |
| 4,158,275 A | 6/1979 | Moore |
| 4,252,154 A | 2/1981 | Alexander, III |
| 4,418,108 A | 11/1983 | Lin |
| 4,425,396 A | 1/1984 | Hartman |
| 4,572,700 A | 2/1986 | Mantarro et al. |
| 4,574,541 A | 3/1986 | Raidt et al. |
| 4,621,013 A | 11/1986 | Holtrop et al. |
| 4,704,048 A | 11/1987 | Ahlgrimm |
| 4,719,734 A | 1/1988 | Fell et al. |
| 4,764,420 A | 8/1988 | Gluck et al. |
| 4,898,761 A | 2/1990 | Dunaway et al. |
| 5,053,265 A | 10/1991 | Alexander |
| 5,091,235 A | 2/1992 | Vergnano ............... 428/192 |
| 5,365,716 A | 11/1994 | Munson |
| 5,466,092 A | 11/1995 | Semenza et al. |
| 5,552,207 A | 9/1996 | Porter et al. |
| 5,695,870 A | 12/1997 | Kelch et al. |
| 5,733,824 A | 3/1998 | Brunka et al. ............ 422/153 |
| 5,773,123 A | 6/1998 | Anwyll, Jr. |
| 5,786,064 A | 7/1998 | Finestone et al. ......... 428/137 |
| 5,787,668 A | 8/1998 | Carkner et al. |
| 5,819,496 A | 10/1998 | Sperber |
| 5,826,388 A | 10/1998 | Irving |
| 5,826,390 A | 10/1998 | Sacks ..................... 52/408 |
| 5,830,548 A | 11/1998 | Andersen et al. |
| 5,836,135 A | 11/1998 | Hagan et al. |
| 5,865,926 A | 2/1999 | Wu et al. |
| 5,869,408 A | 2/1999 | Porter et al. |
| 5,888,614 A | 3/1999 | Slocum et al. ........... 428/132 |
| 6,093,481 A | 7/2000 | Lynn et al. |
| 6,279,284 B1 | 8/2001 | Moras |
| 6,355,333 B1 | 3/2002 | Waggoner et al. ......... 428/174 |
| 6,389,757 B1 | 5/2002 | DeGarie |
| 6,389,767 B1 | 5/2002 | Lucey et al. ............. 52/295 |
| 6,421,973 B1 | 7/2002 | Gregg et al. ............ 52/481.1 |
| 6,524,980 B1 | 2/2003 | Fensel et al. ............ 442/181 |
| 6,537,935 B1 | 3/2003 | Seth et al. ............. 442/366 |
| 6,550,212 B2 | 4/2003 | Lubker, II |
| 6,745,535 B2 | 6/2004 | Nordgren et al. ......... 52/506.01 |
| 6,761,006 B2 | 7/2004 | Lubker |
| 6,869,901 B2 | 3/2005 | Lubker, II .............. 442/208 |
| 6,990,775 B2 | 1/2006 | Koester ................. 52/302.1 |
| 7,082,733 B2 | 8/2006 | Nordgren et al. ......... 52/506.01 |
| 7,093,397 B2 | 8/2006 | Nordgren et al. ......... 52/506.01 |
| 7,100,337 B1 | 9/2006 | Nordgren et al. ......... 52/506.01 |
| 7,309,665 B2 | 12/2007 | Qureshi et al. .......... 442/136 |
| 7,316,840 B2 | 1/2008 | Neculescu et al. ........ 428/297.4 |
| 7,343,716 B2 | 3/2008 | Nordgren et al. ......... 52/506.01 |
| 7,351,459 B2 | 4/2008 | Fay et al. .............. 428/43 |
| 2004/0229012 A1 | 11/2004 | Lubker, II |
| 2004/0255533 A1 | 12/2004 | Koester ................ 52/302.1 |
| 2005/0115196 A1 | 6/2005 | Raymundo et al. ....... 52/782.1 |
| 2005/0287338 A1 | 12/2005 | Lubker, II |
| 2006/0194494 A1 | 8/2006 | Lubker, II ............. 442/208 |
| 2006/0194495 A1 | 8/2006 | Lubker, II ............. 442/208 |
| 2008/0134622 A1 | 6/2008 | Lubker ................ 52/741.4 |
| 2008/0263982 A1 | 10/2008 | Ayvatyan .............. 52/434 |

FOREIGN PATENT DOCUMENTS

| | | |
|---|---|---|
| JP | 46-049524 | 6/1946 |
| JP | 5096673 | 4/1993 |
| JP | 10-273848 | 10/1998 |
| WO | WO0023509 | * 4/2000 |
| WO | WO 02/066242 A | 8/2002 |

* cited by examiner

PROTECTIVE DRAINAGE WRAPS

CROSS-REFERENCE TO RELATED APPLICATION

This application is a CIP of Ser. No. 10/869,333 filed Jun. 16, 2004, now U.S. Pat. No. 7,196,024 which is a DIV of Ser. No. 10/255,273 filed Sep. 26, 2002, now U.S. Pat. No. 6,869,901, which is a CIP of Ser. No. 09/788,776 filed Feb. 20, 2001, now U.S. Pat. No. 6,550,212.

FIELD OF THE INVENTION

The present invention relates generally to protective wraps that are used to protect against air infiltration and moisture build-up in buildings. Specifically, the protective wraps of the present invention include cross-woven material, cross-laminate material or mesh material.

BACKGROUND OF THE INVENTION

There have been many different protective wraps used in the construction of buildings, such as residential and commercial construction. Protective wraps are used to protect against air infiltration and damaging moisture build-up. Air infiltration may occur in typical construction through, among other places, sheathing seams and cracks around windows and doors. Moisture build-up can occur externally in the wall cavity from, for example, leaking exterior finishes or coverings, and cracks around windows and doors. The exterior of the protective wraps should not trap the water, but rather allow it to flow downward so as to exit the wall system.

Protective wraps are typically used as secondary weather barriers in buildings behind exterior finishes or coverings such as siding, brick, stone, masonry, stucco and concrete veneers. Examples of siding include wood siding, aluminum siding, vinyl siding, cementitious siding, wood compositions boards and lapboard. Stucco may be synthetic based (e.g., a polymer-based stucco) or cementitious (a mixture of Portland cement, lime and sand). One type of stucco system, exterior insulation finish system (drainage EIFS), that is used in buildings typically involves using a drainage plane, an insulation board, and a wire or synthetic mesh that accepts a cementitious coating. In stucco systems, protective wraps are not typically installed directly in contact with the cementitious coatings. In some instances, multiple layers of protective wrap are installed with one layer contacting the cementitious coatings. These multiple layers may be house wrap, building paper or both.

Both woven and non-woven protective wraps are commonly used in the construction of buildings. The strength properties of woven wraps are typically much higher than the strength properties of non-woven wraps. Some woven wraps are translucent, which assist in locating studs, as well as window and door openings. Non-woven wraps, however, may have higher permeabilities than woven wraps.

Protective wraps, such as non-woven wraps, woven wraps and cross-laminated wraps, also may be micro-perforated so as to allow moisture vapor to pass therethrough. Most non-woven commercial protective wraps (such as spun bonded polyolefin wraps) are not perforated because the processes used in forming the wraps result in a structure that inherently allows the moisture vapor to pass through the wrap.

Accordingly, a need exists for a protective wrap that enhances drainage of damaging moisture build-up, while still protecting against air infiltration.

SUMMARY OF THE INVENTION

According to one embodiment, a protective drainage wrap comprises a cross-woven material portion, cross-laminate material portion or mesh material portion in a first direction and in a second direction, and a breathable solid layer portion. The material in the first direction comprises a polyolefin, polyester, nylon or combinations thereof. The material in the second direction comprises a polyolefin, polyester, nylon or combinations thereof. The first direction is roughly perpendicular to the second direction. The cross-woven material portion, cross-laminate material portion or mesh material portion is adapted to facilitate a drainage path. The breathable solid layer portion is attached to the cross-woven material portion, cross-laminate material portion or mesh material portion. The breathable solid layer portion is adapted to allow water vapor to flow therethrough.

According to another embodiment, a protective drainage wrap comprises a cross-woven material portion, cross-laminate material portion or mesh material portion in a first direction and in a second direction, and a breathable solid layer portion. The material in the first direction comprises a polyolefin, polyester, nylon, yarn or combinations thereof. The material in the second direction comprises a polyolefin, polyester, nylon, yarn or combinations thereof. The first direction is roughly perpendicular to the second direction. The cross-woven material portion, cross-laminate material portion or mesh material portion is adapted to facilitate a drainage path. At least one of the materials in the first direction and the second direction is yarn. The breathable solid layer portion is attached to the cross-woven material portion, cross-laminate material portion or mesh material portion. The breathable solid layer portion is adapted to allow water vapor to flow therethrough.

According to one method, a protective wrap is provided to be used in a building. The protective wrap is provided and includes a cross-woven material portion, cross-laminate material portion or mesh material portion in a first direction and in a second direction, and a breathable solid layer portion. The material in the first direction comprises a polyolefin, polyester, nylon, yarn or combinations thereof. The material in the second direction comprises a polyolefin, polyester, nylon, yarn or combinations thereof. The first direction is roughly perpendicular to the second direction. The cross-woven material portion, cross-laminate material portion or mesh material portion is adapted to facilitate a drainage path. The breathable solid layer portion is attached to the cross-woven material portion, cross-laminate material portion or mesh material portion. The breathable solid layer portion is adapted to allow water vapor to flow therethrough. At least one framing member is provided. The protective wrap is installed over at least one of the framing members.

According to another method, a protective wrap is provided to be used in a building. The protective wrap is provided and includes a cross-woven material portion, cross-laminate material portion or mesh material portion in a first direction and in a second direction, and a breathable solid layer portion. The material in the first direction comprises a polyolefin, polyester, nylon, yarn or combinations thereof. The material in the second direction comprises a polyolefin, polyester, nylon, yarn or combinations thereof. The first direction is roughly perpendicular to the second direction. The cross-woven material portion, cross-laminate material portion or mesh material portion is adapted to facilitate a drainage path. The breathable solid layer portion is attached to the cross-woven material portion, cross-laminate material portion or mesh material portion. The breathable solid layer portion is adapted to allow water vapor to flow therethrough. Sheathing is provided and the protective wrap is installed over the sheathing.

According to one method of forming a protective drainage wrap, a cross-woven material portion, cross-laminate material portion or mesh material portion is provided in a first direction and in a second direction. The material in the first direction comprises a polyolefin, polyester, nylon, yarn or combinations thereof. The material in the second direction comprises a polyolefin, polyester, nylon, yarn or combinations thereof. The first direction is roughly perpendicular to the second direction. The cross-woven material portion, cross-laminate material portion or mesh material portion is adapted to facilitate a drainage path. A breathable solid layer portion is applied to the cross-woven material portion, cross-laminate material portion or mesh material portion. The breathable solid layer portion is attached to the cross-woven material portion, cross-laminate material portion or mesh material portion. The breathable solid layer portion is adapted to allow water vapor to flow therethrough.

Figure 1:
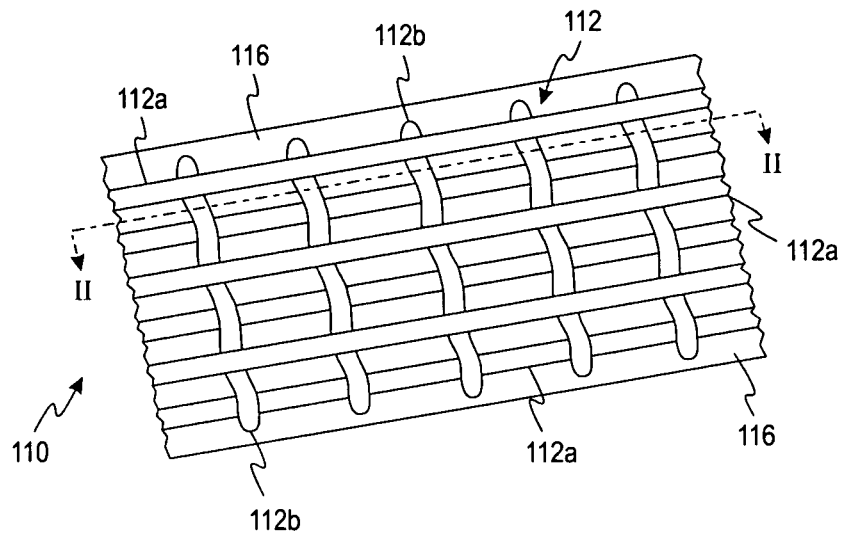
FIG. 1 is a top perspective view of a cross-woven protective wrap according to one embodiment.

While the invention is susceptible to various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF SPECIFIC EMBODIMENTS

Turning now to the drawings and referring initially to FIGS. 1 and 2, a protective drainage wrap 110 according to one embodiment is shown. The protective wraps of the present invention, including protective wrap 110, are adapted to be attached over sheathing or framing members. The protective wraps are typically covered by an exterior covering such as siding, brick, stone, masonry, stucco (e.g., synthetic or cementitious) or concrete veneer.

Figure 2A:
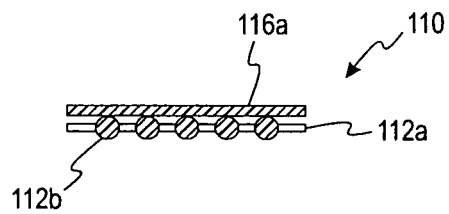
FIG. 2a is a cross-sectional view taken generally along line II-II of FIG. 1 using a breathable film.
Figure 2B:
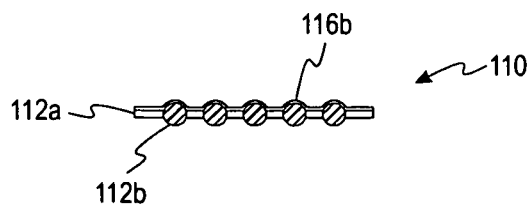
FIG. 2b is a cross-sectional view taken generally along line II-II of FIG. 1 using a breathable coating.
Figure 3:
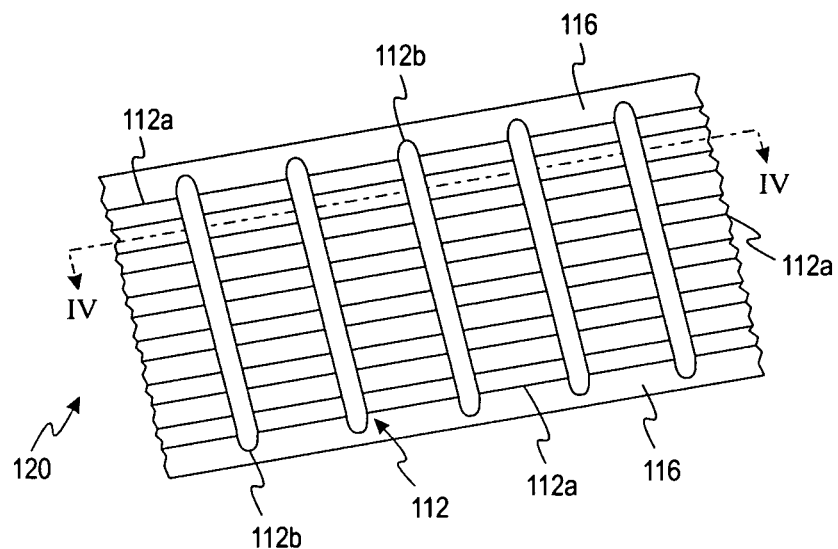
FIG. 3 is a top perspective view of a cross-laminated protective wrap according to one embodiment of the present invention.
Figure 4:
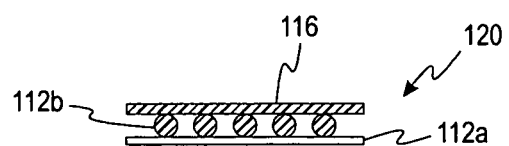
FIG. 4 is a cross-sectional view taken generally along line IV-IV of FIG. 3.
Figure 5:
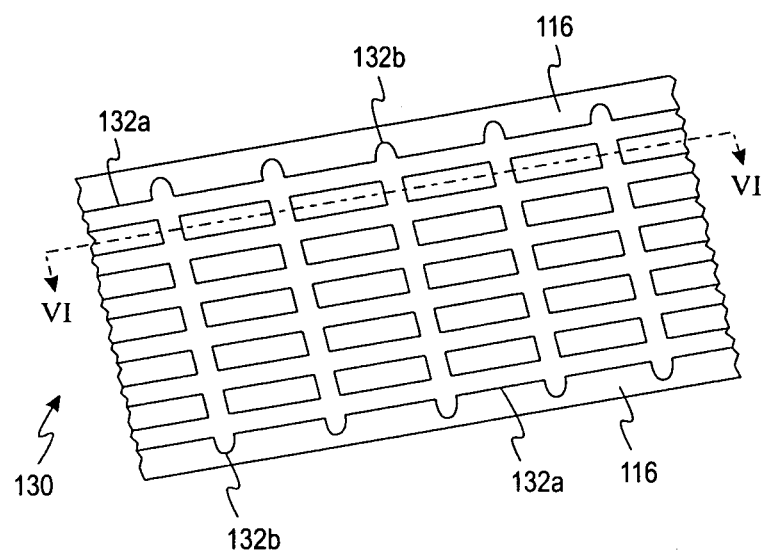
FIG. 5 is a top perspective view of a mesh protective wrap according to one embodiment.
Figure 6:
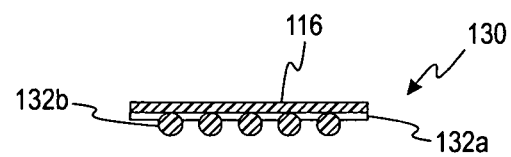
FIG. 6 is a cross-sectional view taken generally along line VI-VI of FIG. 5.

According to one embodiment, the protective wrap 10 of FIGS. 1 and 2 comprises a cross-woven material portion 112 and a breathable solid layer portion 116. In another embodiment, the protective drainage wrap may includes a cross-laminate material portion, such as shown in FIGS. 3 and 4 with a cross-laminated protective drainage wrap 120. In a further embodiment, the protective drainage wrap may include a mesh material portion, such as shown in FIGS. 5 and 6 with a mesh protective drainage wrap 130.

The cross-woven material portion, cross-laminate material portion or mesh material portion of the protective wrap provides a desirable strength that assists in inhibiting or preventing tears and/or fraying that may be caused during installation. These tears and/or fraying may be caused by, for example, nails or staples during the installation of the protective wraps. These tears and/or fraying may also be caused after installation by environmental conditions such as wind, UV degradation or by vandalism before the protective wrap is covered with an exterior covering.

The cross-woven material portion is located in a first direction and a second direction, in which the first direction is roughly perpendicularly to the second direction. It is desirable for the first direction to be substantially perpendicular or perpendicular to the second direction of the cross-woven material. For example, referring back to FIG. 1, the cross-woven material portion 112 comprises a plurality of machine direction (MD) tapes or strands 112a and a plurality of transverse direction (TD) tapes or strands 112b. The machine direction is also referred to as "warp", while the transverse direction is also referred to as "fill" or "weft".

The scrim shown in FIG. 1 is a 10×4 count scrim (MD number per inch×TD number per inch) that has been enlarged. It is also contemplated that various other scrim counts may be used, including a 7×3 count, a 10×5 count and a 16×5 count, in forming the cross-woven material portion of the present invention. The scrim count is typically a greater number in the machine direction than the transverse direction. The MD scrim count is generally from about 6 to about 24 tapes per inch, while the TD scrim count is generally from about 3 to about 12 tapes per inch. The MD and TD scrim counts are generally lesser in number per inch as the respective widths of the MD and TD tapes are increased.

The plurality of machine direction tapes 112a may be made of materials such as polyolefins, polyesters, nylons or combinations thereof. Polyolefins that may be used in forming the machine direction tapes 112a include polypropylenes or polyethylenes. The term "polypropylene" as used herein includes polymers of propylene or polymerizing propylene with other aliphatic polyolefins, such as ethylene, 1-butene, 1-pentene, 3-methyl-1-butene, 4-methyl-1-pentene, 4-methyl-1-hexene, 5-methyl-1-hexene and mixtures thereof. Polypropylene not only includes homopolymers of propylene, but also propylene copolymers comprised of at least 50 mole percent of a propylene unit and a minor proportion of a monomer copolymerizable with propylene and blends of at least 50 percent by weight of the propylene homopolymer with another polymer.

The term "polyethylene" as used herein includes low density polyethylene (LDPE), medium density polyethylene (MDPE), high density polyethylene (HDPE), very low density polyethylene (VLDPE), linear low density polyethylene (LLDPE), metallocene-catalyzed linear low density polyethylene (mLLDPE) and combinations thereof.

An example of a "polyester" includes a polyester resin, which is a polycondensation product of a dicarboxylic acid with a dihydroxy alcohol. An example of a "polyethylene terephthalate" includes a polyester resin made from ethylene glycol and terephthalic acid. An example of a "nylon" is a polyamide polymer that is characterized by the presence of the amide group (—CONH).

Each of the plurality of machine direction tapes 112a may be made of a single fiber or filament, or a plurality of fibers or filaments aligned with each other. It is contemplated that the plurality of machine direction tapes 112a may be made of a mixture of single fibers or filaments, and a plurality of fibers or filaments aligned with each other. For example, the single fibers or filaments may be alternated with the plurality of filaments aligned with each other such that the thicknesses of the plurality of machine direction tapes 112a vary. The machine direction tapes 112a may also be referred to as cords. As shown in FIG. 1, the plurality of machine direction tapes 112a is substantially flat.

The plurality of transverse direction tapes 112b may be made of materials such as polyolefins, polyesters, nylons or combinations thereof as described above with respect to the machine direction tapes 112a. Polyolefins that may be used in forming the transverse direction tapes 112b include polypropylenes and polyethylenes. Each of the plurality of transverse direction tapes 112b may be made of single fibers or filaments, or a plurality of fibers or filaments aligned with each other. It is contemplated that the plurality of transverse direction tapes 112b may be made of a mixture of single fibers or filaments, and a plurality of fibers or filaments aligned with each other. For example, the single fibers or filaments may be alternated with the plurality of filaments aligned with each other such that the thicknesses of the plurality of transverse direction tapes 112b vary. The transverse direction tapes 112b may also be referred to as cords. As best shown in FIG. 2, each of the transverse direction tapes 112b is shaped in a generally oval manner. The plurality of transverse direction tapes 112b is desirably substantially circular or circular in shape. The transverse direction tapes 112b are shaped in a manner that will allow water to flow down the channels formed between the transverse direction tapes 112b via gravity.

The thicknesses of transverse direction tapes 112b of the present invention provide unique vertical channels, when installed, that enhance moisture drainage external to the protective wrap (i.e., between the protective wrap and the exterior finish). The installed transverse direction tapes 112b allow water to readily exit a wall system. To enhance moisture drainage, the thickness of the transverse direction tapes 112b is generally at least about 2 times greater than the thickness of the machine direction tapes 112a. This is more desirable in cross-woven protective wraps as opposed to cross-laminated protective wraps. The thickness of the transverse direction tapes 112b is generally at least about 3 or about 4 times greater than the thickness of the machine direction tapes 112a. The thickness of the transverse direction tapes 112b may be from about 6 to about 8 times greater than the thickness of the machine direction tapes 112a.

Figure 7A:
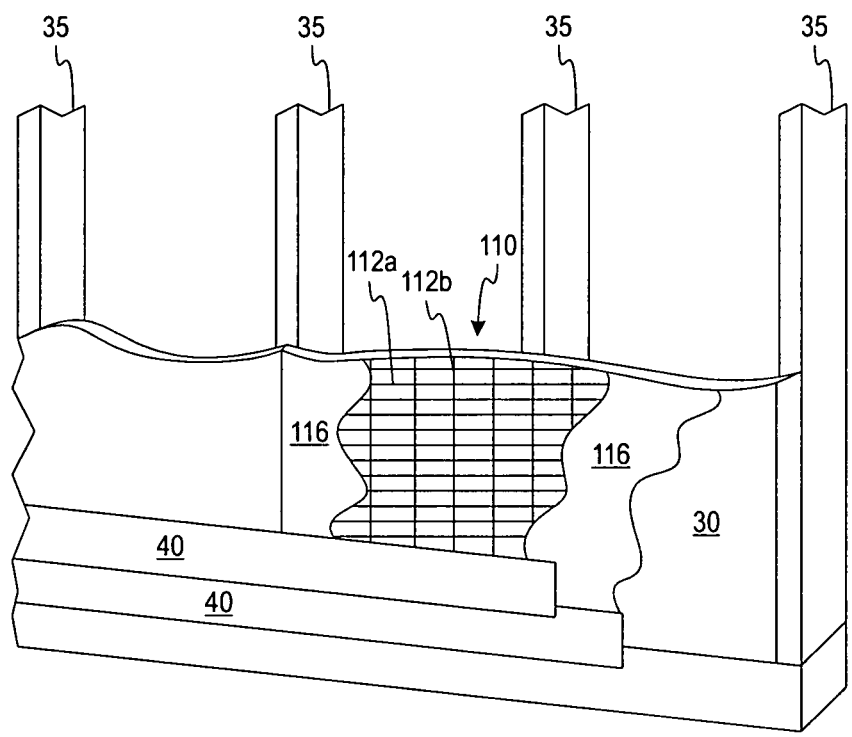
FIG. 7a is a cut-away perspective view of the protective wrap of FIG. 1 fastened to sheathing and a framing member according to another embodiment of the present invention.

The plurality of transverse direction tapes 112b according to one embodiment is shown in FIG. 7a after being installed. The transverse direction tapes 112b are generally perpendicular to the machine direction tapes 112a so as to enhance moisture drainage. It is contemplated that the tapes 112b may be located roughly perpendicular (e.g., generally diagonally) with respect to the tapes 112a as long as the tapes 112b are in a generally downward position when installed.

The cross-woven material portion 112 comprising the plurality of MD and TD tapes 112a and 112b may be made from an extrusion process. After being formed, the tapes 112a and 112b may be cross-woven by different processes. One contemplated process for weaving the tapes 112a and 112b together is through the use of a loom.

Alternatively, the MD and TD tapes 112a and 112b may be cross-laminated to each other by attaching the tapes 112a and 112b together via the use of a suitable adhesive, heat bonding, UV-cured material or other attaching method (see FIGS. 3 and 4). The adhesive is selected based on the materials used to form the tapes 112a and 112b. The cross-laminated protective wrap 130 of FIGS. 3 and 4 form natural channels without increased thickness because the tapes 112b form a natural channel over the tapes 112a.

Referring to FIGS. 5 and 6, the protective wrap 130 is shown that includes a mesh material portion 132 and the breathable solid layer portion 116. The mesh material portion 132 includes a pattern that has a plurality of tape or strand portions extending in a first direction and in a second direction. Specifically, the mesh material portion 132 includes a plurality of machine direction tape or strand portion 132a and a plurality of transverse direction tape or strand portion 132b. The mesh material portion is an integral structure and may be formed using a mold.

The mesh material may have unequal number of tape or strand portions going in the first and second directions. These may be similar to the scrim counts described above in connection with the machine and transverse direction tapes 112a, 112b. The mesh material portion 132 may be made of materials such as polyolefins, polyesters, nylons or combinations thereof. Polyolefins that may be used in forming the tape portions 132a, 132b include polypropylenes or polyethylenes. The mesh material portion 132 is shaped in a manner that will allow water to flow down the channels formed between the transverse direction tape portions 132b via gravity. It is desirable for the thickness of the transverse direction tape portion 132b to be at least about 2 times greater than the thickness of the machine direction tape portion 132a so as to provide a channel to enhance the drainage of the water from the wall system. The thickness of the transverse direction tape portion 132b may be at least about 3 to 4 times greater than the thickness of the machine direction tape portion 132a.

To assist in natural vapor transmission, the protective wraps of the present invention includes a breathable solid layer portion (see, e.g., FIGS. 1 and 2 with breathable solid layer portion 116). The breathable solid layer portion allows water vapor to exit while preventing or inhibiting water flow therethrough. Natural vapor transmission is desirable because of moisture build-up occurring from internal moist air present in the wall cavity. Moisture build-up may occur from materials, such as green lumber, used in framing or structural sheathing. Moisture build-up may also occur from environmental elements, such as rain, during construction before an exterior finish has been installed or water that enters the installed wall system. In addition to moisture, some air will pass through the breathable solid layer portion. It is desirable that the breathable solid layer portion has a permeability of from about 5 to about 50 perms. The most desired permeability is dependent on the application and environmental conditions where the protective wrap is used.

The breathable solid layer portion of the protective wrap is applied to the cross-woven material portion, cross-laminate material portion or the mesh material portion. The breathable solid layer portion 116 may be a breathable coating or may be a breathable film. For example, FIG. 2a shows the breathable solid layer portion 116 as a breathable film 116a, while FIG. 2b shows the breathable solid layer portion 116 as a breathable coating 116b. The breathable solid layer portion includes materials that are inherently breathable or materials that are processed in such a manner that the material becomes breathable.

The breathable solid layer portion may be made of materials that are inherently breathable such as polyurethane, nylon or spun-bonded polyolefins. It is contemplated that other materials may be used in forming the breathable solid layer portion. The breathable solid layer portion made of inherently breathable material may be a breathable coating or a breathable film.

The breathable coating may be applied by various processes to the cross-woven material portion, cross-laminate material portion or the mesh material portion. According to one process of the present invention, pellets of a resin(s) for forming the breathable coating are added in their solid form into an extrusion hopper. These pellets are heated to a sufficient temperature in an extruder to form a molten material. The molten material that will form the breathable coating exits the extruder through a die. The extruder typically has a horizontal die in which the molten material exits and falls vertically by gravity onto a surface of the cross-woven material portion, cross-laminate material portion or the mesh material portion. At the same time the molten material is exited from the extruder, the cross-woven material portion, cross-laminate material portion or the mesh material portion proceeds in a direction transverse to the extruder.

The cross-woven material portion, cross-laminate material portion or the mesh material portion may proceed on a transport mechanism involving rollers that pull the cross-woven, cross-laminated material or mesh material portion along a threaded path. The transport mechanism is located below the extruder die that extrudates the coating. The amount of breathable coating applied to the cross-woven material portion, cross-laminate material portion or the mesh material portion depends on factors such as the speed of the transport mechanism, size of the extruder die opening, and speed of the coating exiting the die. The amount of breathable coating used should be sufficient to form a breathable solid layer portion that covers the cross-woven material portion, cross-laminate material portion or the mesh material portion without leaving pin holes or interstices.

The breathable coating or film of the present invention is generally applied to obtain a thickness of from about 0.5 mil to about 2 mils, and desirably from about 0.8 to about 1.2 mil.

In another embodiment, the breathable solid layer portion may be made of materials that are further processed to become a breathable film or breathable coating. In one process, material is extruded or blown to form a film. The resulting extruded or blown film is then further processed (e.g., stretched) to form a breathable film or breathable coating that provides air and moisture breathability. It is contemplated that other processing may be used to form the breathable film or breathable coating.

In one process, material is extruded to form a coating. The coating is applied to the cross-woven material portion, cross-laminate material portion or the mesh material portion, and then further processing (e.g., stretching) occurs to form a breathable coating.

Materials that may be further processed to form the breathable solid layer portion include polyolefins, polyurethanes, polyesters and nylons. Polyolefins that may be used in forming the breathable film include polyethylene, polypropylene or the combination thereof. It is contemplated that other materials may be used and further processed to form the breathable solid layer portion.

It is contemplated that the material to be used in forming the breathable film or coating may include additional components such as a mineral or inorganic filler. Non-limiting examples of fillers that may be used include calcium carbonate, talc, clay, titanium dioxide, barium sulfate, fungible fillers, polystyrenes, and zeolites. It is contemplated that other materials may be used including other finely powdered inorganic materials. The average size of the mineral or inorganic filler may vary, but is generally from about 0.1 to about 5 microns. The average particle size and size distribution is typically optimized for the desired properties and end uses.

For example, the breathable film or coating may include at least one polyolefin and a mineral or inorganic filler in one embodiment. In this embodiment, the breathable film or coating typically includes at least about 40 wt. % of the filler with the balance being the polyolefin. The breathable film or coating generally comprises from about 40 to about 60 wt. % filler.

In one embodiment; the breathable film comprises polyetheylene or polypropylene in combination with calcium carbonate. The polyethylene or polypropylene is mixed with the calcium carbonate and melted. The composition is extruded into a film by, for example, a blown or cast process. In one embodiment, the film including a polyolefin (e.g., polyethylene or polypropylene) and a filler (e.g., calcium carbonate) is stretched, resulting in the bonds of the film breaking slightly around the location of the mineral filler. By slightly breaking the bonds of the film, the film becomes a breathable film. The stretching of the film is typically performed prior to attachment with the cross-woven material portion, cross-laminate material portion or the mesh material portion, but may be performed after attachment to the cross-woven material portion, cross-laminate material portion or the mesh material portion.

The stretching may be performed by a machine direction orientation, cross machine direction tentering, intermeshing stretching or a combination thereof. Machine direction orientation typically involves running the film between two pairs of rollers in which the second pair of rollers is running faster than the first pair. Because of the difference in speeds between the pair of rollers, the film is stretched. Cross machine direction tentering typically includes grasping the sides of the film and stretching it sideways. Intermeshing stretching, which may also be referred to as incremental or interdigitating stretching typically involves the film traveling between two grooved or toothed rollers. One example of an intermeshing process technology is disclosed in U.S. Pat. No. 5,865,926 to Clopay Plastic Products Company of Cincinnati, Ohio. It is contemplated that other stretching techniques may be used to form the breathable film. This type of breathable film may be referred to as a voided polymeric coating.

Breathable films that may be used include those made by 3M Company (SCOTCH® microporous films), Exxon (Exxaire porous films) and AssiDoman Bellcoat in Belgium. It is contemplated that other breathable films may be used in the present invention.

In one method, the breathable film is applied to the cross-woven material portion, cross-laminate material portion or mesh material portion using an adhesive. It is desirable for the adhesive to be located initially on the cross-woven material portion, cross-laminate material portion or mesh material portion before being attached to the breathable film. It is contemplated that the adhesive may be selectively located on the breathable film. The adhesive in these embodiments are not typically placed in such a manner that the water vapor would be hindered in traveling through the breathable film. In another embodiment, the adhesive may be a breathable adhesive such that water vapor is adapted to travel therethrough. A breathable adhesive is desirable in that it will not inhibit or prevent water vapor from exiting through the breathable film.

In another method, the breathable film is applied to the cross-woven material portion, cross-laminate material portion or mesh material portion by lamination or thermobonding. The thermobonding should not be performed at temperatures where the breathable film loses the ability to allow the water vapor to travel therethrough.

Figure 9:
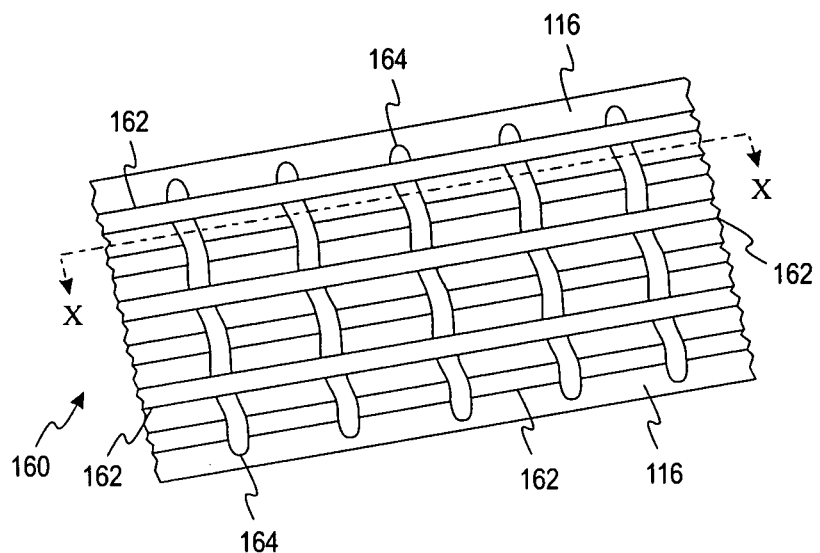
FIG. 9 is a top perspective view of a yarn cross-woven protective wrap according to yet another embodiment of the present invention.
Figure 10:
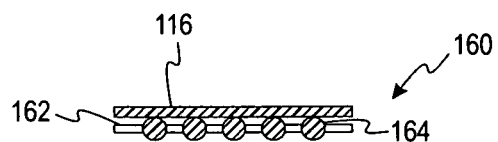
FIG. 10 is a cross-sectional view taken generally along line X-X of FIG. 9.

According to another embodiment, a protective drainage wrap 160 is shown in FIGS. 9 and 10. As discussed above with respect to the protective wrap 110, the protective wrap 160 is adapted to be attached to sheathing or framing members. The protective wrap 160 comprises a tape or strand portion 162, a yarn portion 164 and a breathable solid layer portion 116. The tape portion 162 of FIGS. 9 and 10 comprises a plurality of tapes in a first direction (e.g., the machine direction), while the yarn portion 164 comprises a plurality of yarn strands in a second direction (e.g., the transverse direction).

The yarn portion 164 is capable of absorbing moisture such as water. Additionally, the yarn portion 164 may be capable of wicking the moisture that may provide further enhancement to the hydration properties. To assist in moving the water downwardly via gravity, the yarn portion 164 is preferably installed in a generally vertical position. In addition, the yarn portion 164 provides a channeling effect between the plurality of yarn strands to assist in moving the water downwardly. If the channel formed between adjacent yarn strands is blocked by, for example, stucco, then the water may be absorbed by the yarn. This absorbed water may flow downwardly via the yarn strand or may be transported to another channel for moving the water downwardly.

Types of yarn that may be used in the present invention include spun yarn, bulk continuous process (bcp) yarn and natural yarn (e.g., jute). Spun yarn may be formed by a two step process in which very small filaments are extruded and chopped to a selected length. These filaments are then spun into a continuous yarn using, for example, a spinning frame. Bulk continuous process yarns may be formed by extruding 70 or 80 very small fibers into continuous filaments that are spaced in close proximity to each other. The close proximity of the continuous filaments allows for the filaments to be intertwined by air entanglement or twisting to create a single yarn. It is contemplated that the yarn may be made in a larger diameter monofilament to assist in providing strength to the protective wrap. The larger diameter monofilaments may be used on a portion of the protective such as in an alternating technique with bulk continuous process yarns.

The yarn portion 164 may be made of polymeric materials such as polyolefins, polyesters, nylons or combinations thereof. Some contemplated polyolefins to be used in forming the yarn portion 164 include polypropylenes or polyethylenes. Each of the plurality of strands of the yarn portion 164 shown in FIG. 9 is made of a plurality of fibers or filaments twisted with each other. It is contemplated that the strands of yarn portion 164 may have varying numbers of fibers or filaments twisted with each other such that the thicknesses of the strands differ. For example, the strands of yarn portion 164 may alternate the number of fibers or filaments twisted with each other to provide strands of varying thicknesses. One type of yarn that is contemplated is a spun polypropylene yarn that is manufactured by Propex Fabrics. The tape portion 162 and the yarn portion 164 may be both made from polypropylenes.

The tape portion 162 may be made of materials such as polyolefins, polyesters, nylons or combinations thereof. Examples of such materials include polypropylenes or polyethylenes. The tape portion 162 may be made in a similar manner as described above with respect to the machine direction tape 112a.

The yarn portion 164 and the tape portion 162 are preferably located in directions that are generally perpendicular to each other. This location of the yarn portion 164 with respect to the tape portion 162 is depicted in FIG. 9. It is contemplated, however, that the yarn portion 164 may be located roughly perpendicular (e.g., generally diagonally) from the tape portion 162 as long as the yarn portion 164 is in a generally downward position when installed.

As depicted in FIG. 9, each of the plurality of yarn strands of the yarn portion 164 is woven between the plurality of tapes/strands of the tape portion 162. When cross-woven, the combination of the yarn-portion 164 and the tape portion 162 may be referred to as a cross-woven scrim. The yarn portion 164 and the tape portion 162 may be woven by various techniques. One such example is with the use of a loom that weaves the yarn portion 164 and the tape portion 162.

Alternatively, the tape portion 162 and the yarn portion 164 may be cross-laminated (not shown) by adhering the plurality of tapes and plurality of yarn strands together via the use of a suitable adhesive.

Additives to the protective wraps are contemplated in the present invention. For example, the protective wraps may include colorant additives to resist the glare of the sun. The addition of colorant assists workers in installing the protective wrap. The protective wraps may also include chemical additives such as ultraviolet inhibitors and antioxidants to withstand deterioration from prolonged exposure to sunlight. In addition, the protective wraps of the present invention may be translucent. Translucent protective wraps assist in locating studs, as well as window and door openings. The protective wraps of the present invention may also include printing thereon.

The protective wraps of the present invention provide improved drainage characteristics. The protective wraps of the present invention also provide for water vapor transmission rates (WVTR) as measured by ASTM E 96, Procedure A.

The tensile strength of woven protective wraps as measured by ASTM D 882 is generally greater than about 25 lbs./in. The tensile strength of woven protective wraps is preferably greater than about 30 lbs./in. and more preferably greater than about 35 lbs./in. as measured by ASTM D 882. It is beneficial that the protective wraps of the present invention are strong so as to inhibit or prevent tearing and/or fraying during or after installation. Tearing and/or fraying may, and typically will, result in unwanted air infiltration and/or moisture penetration.

The TD tear strength of woven protective wraps as measured by ASTM D 1117 is generally greater than 25 lbs. The TD tear strength of woven protective wraps is preferably greater than about 30 lbs. and more preferably greater than about 35 lbs. as measured by ASTM D 1117.

The tensile strength of non-woven protective wraps as measured by ASTM D 882 is generally greater than about 15 lbs./in, and preferably greater than about 20 or 25 lbs./in. The TD tear strength of non-woven protective wraps as measured by ASTM D 1117 is generally greater than 10 lbs., and preferably greater than about 15 or 20 lbs.

The protective wraps of the present invention may be formed into a number of shapes. The protective wraps, however, are generally stored in a roll on a circular cardboard core. The protective wraps of the present invention may be manufactured in a variety of sizes. Popular sizes used in residential and commercial construction include, but are not limited to, 3 foot by 100 foot (3'×100'), 4.5'×100', 4.5'×150', 4.5'×195', 9'×100', 9'×150', 9'×195' and 10'×150'. For example, the 3' length extends in the transverse direction, while the 100' length extends in the machine direction.

The thickness of the protective wraps may also vary, but is generally from about 8 to about 12 mils as measured by ASTM D 751. The thickness of the protective wraps is typically from about 9 to about 11 mils. Popular thickness of protective wraps includes about 10 mils.

The protective wraps of the present invention may be used as wraps in residential and commercial buildings. The protective wrap is typically covered by an exterior covering like siding, brick, stone, masonry or concrete veneer. Alternatively, the protective wraps of the present invention may be used as stucco drainage wraps in which the protective wraps are covered by a cementitious exterior covering (stucco or EIFS). The protective wrap may also assist in controlling the drying/curing process of the cementitious exterior covering so that the hydration of the exterior covering will not occur too fast or too slow.

According to one process of the present invention, a protective drainage wrap is attached directly to sheathing which is attached to framing members. The sheathing may be made from various materials. Some examples of materials used as sheathing include thin composite laminations, fiberboard, oriented-strand board (OSB), plywood, polyisocyanurate foam, extruded polystyrene (XPS) foam, and molded expanded polystyrene (EPS) foam. Some examples of framing members include plywood and OSB. The protective wraps may be attached mechanically to the sheathing by using fasteners such as nails or staples.

One example of a protective wrap attached to a sheathing is shown in FIG. 7a where the protective wrap 110 (cross-woven material 112 and breathable solid layer portion 116) is installed over the sheathing 30. The sheathing 30 is attached to a plurality of framing members 35. Types of framing members that may be used include southern yellow pine (SYP) and spruce pine fur (SPF). Some framing members, however, may be made of metal. In another embodiment, the framing members may be structural insulated panels. The protective wrap 110 of FIG. 7a has been cut-away to depict the cross-woven portion 112 and the breathable solid layer portion 116. FIG. 7a also shows an exterior covering (siding 40) that is located on an exterior surface of the protective wrap 110. The breathable solid layer portion 116 of FIG. 7a is located adjacent to the sheathing 30.

Figure 7B:
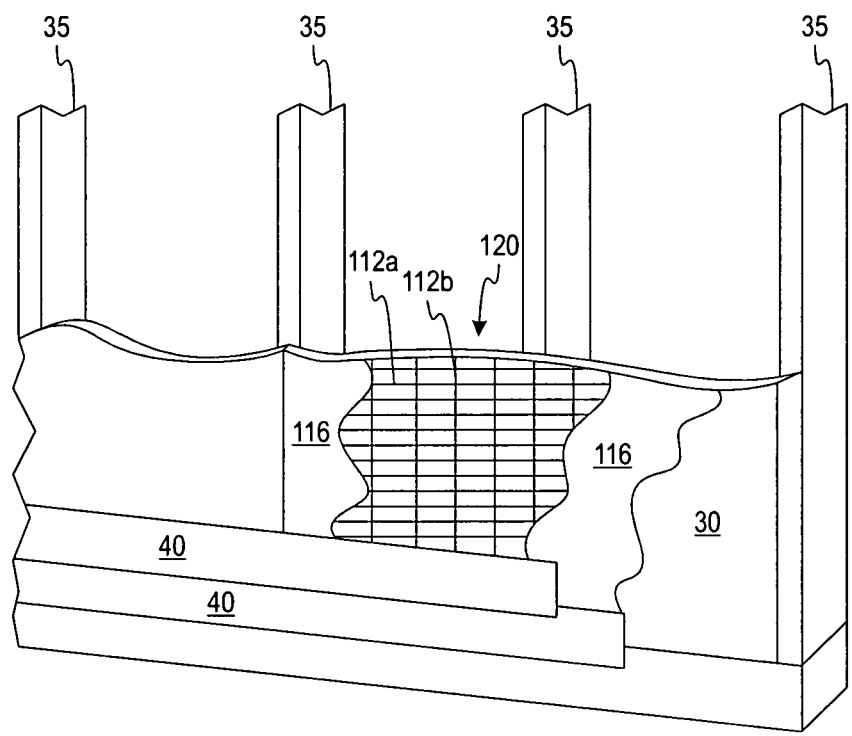
FIG. 7b is a cut-away perspective view of the protective wrap of FIG. 3 fastened to sheathing and a framing member according to another embodiment of the present invention.

The protective wrap 120 may be attached in a similar fashion as described above with respect to protective drainage wraps 110. The protective wrap 120 is shown in FIG. 7b as being installed over the sheathing 30. The sheathing 30 is attached to the plurality of framing members 35.

Figure 8:
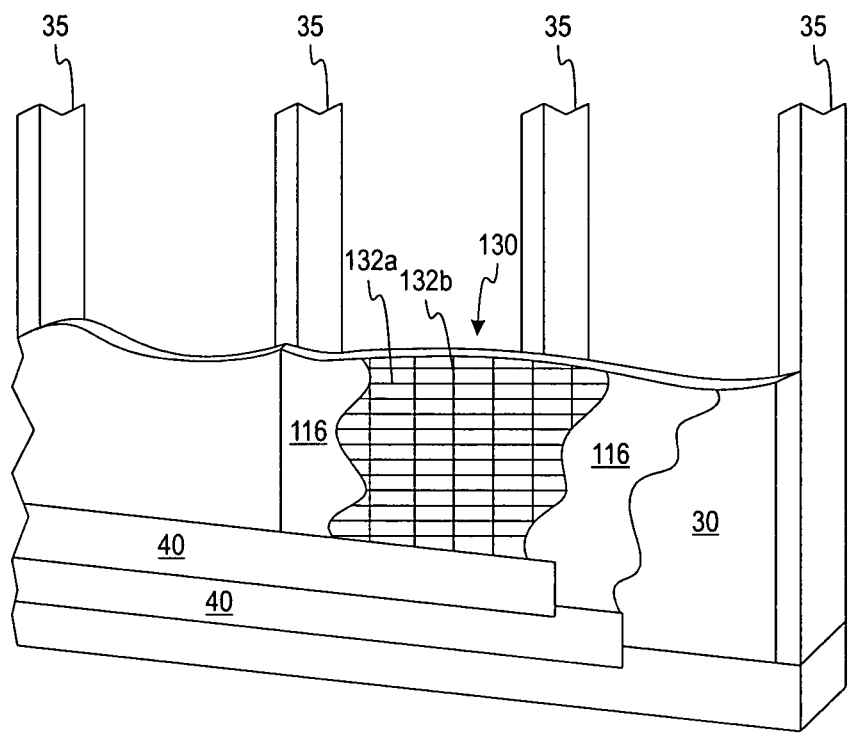
FIG. 8 is a cut-away perspective view of the protective wrap of FIG. 5 fastened to sheathing and a framing member according to a further embodiment of the present invention.

Referring to FIG. 8, another example of a protective wrap attached to a sheathing is shown where the protective wrap 130 (mesh material portion 132 and breathable solid layer portion 116) is installed over the sheathing 30. The sheathing 30 is attached to a plurality of framing members 35. The protective wrap 130 of FIG. 8 has been cut-away to depict the mesh portion 132 and the breathable solid layer portion 116. FIG. 8 also shows an exterior covering (siding 40) that is located on an exterior surface of the protective wrap 130. The breathable solid layer portion 116 of FIG. 8 is located adjacent to the sheathing 30.

Figure 11:
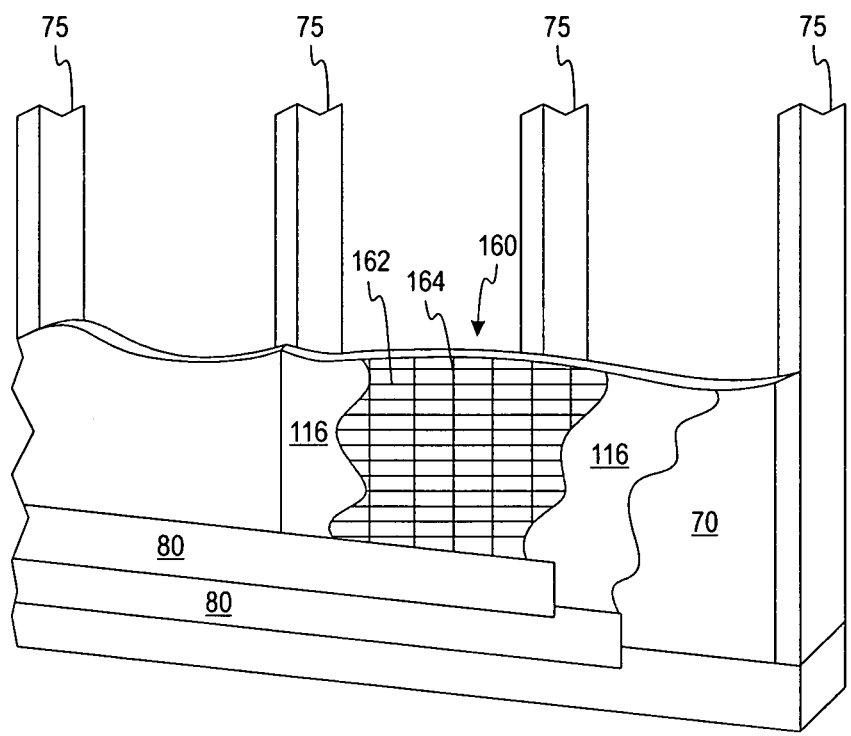
FIG. 11 is a cut-away perspective view of the protective wrap of FIG. 9 fastened to sheathing and a framing member according to yet another embodiment of the present invention.

The protective drainage wrap 160 (tape portion 162, yarn portion 164 and the breathable solid layer portion 116) is shown in FIG. 11 over sheathing 70. The sheathing is attached to a plurality of framing members 75. The protective wrap 160 of FIG. 11 has been cut-away to depict the tape portion 162, the yarn portion 164 and breathable solid layer portion 116. FIG. 11 also shows an exterior covering (siding 80) that is located on an exterior surface of the protective wrap 160. The breathable solid layer portion 116 of FIG. 11 is located adjacent to the sheathing 70.

According to another process of the present invention (not shown), the protective wrap is installed directly over a plurality of framing members. The protective wrap may be attached to the plurality of framing members in a similar manner as discussed above with respect to attaching the protective wrap to the sheathing.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A protective drainage wrap comprising:
    a cross-woven material portion, cross-laminate material portion or mesh material portion in a first direction and in a second direction, the material in the first direction comprising a polyolefin, polyester, nylon or combinations thereof, the material in the second direction comprising a polyolefin, polyester, nylon or combinations thereof, the first direction being roughly perpendicular to the second direction, the cross-woven material portion, cross-laminate material portion or mesh material portion being adapted to facilitate a drainage path, wherein the first direction material has a first thickness, the second direction material having a second thickness, the second thickness being at least about 2 times greater than the first thickness so as to assist in providing drainage for moisture build-up; and
    a breathable solid layer portion being attached to the cross-woven material portion, cross-laminate material portion or mesh material portion, the breathable solid layer portion being adapted to allow water vapor to flow therethrough in the absence of pinholes or interstices.

2. The protective wrap of claim 1 wherein the second thickness is at least about 4 times greater than the first thickness.

3. The protective wrap of claim 1 wherein the protective wrap includes the cross-woven material portion.

4. The protective wrap of claim 1 wherein the protective wrap includes the cross-laminate material portion.

5. The protective wrap of claim 1 wherein the protective wrap includes the mesh material portion.

6. The protective wrap of claim 1 wherein the first direction is the machine direction material and the second direction is the transverse direction material.

7. The protective wrap of claim 1 wherein the first direction material and the second direction material independently comprise polypropylene, polyethylene or combinations thereof.

8. The protective wrap of claim 1 wherein the first direction material and the second direction material are the same.

9. The protective wrap of claim 1 wherein the first direction material and the second direction material are different.

10. The protective wrap of claim 1 wherein the first direction material comprises a rectangular tape and the second direction material comprises generally oval or generally circular filaments.

11. The protective wrap of claim 1 wherein the breathable solid layer portion is a breathable coating.

12. The protective wrap of claim 11 wherein the breathable coating is polyolefins, polyurethane or nylon.

13. The protective wrap of claim 11 wherein the breathable coating includes a polyolefin and a mineral or inorganic filler.

14. The protective wrap of claim 1 wherein the breathable solid layer portion is a breathable film.

15. The protective wrap of claim 14 wherein the breathable film includes polyolefins, polyurethanes and nylons.

16. The protective wrap of claim 14 wherein the breathable film includes a polyolefin and a mineral or inorganic filler.

17. A protective drainage wrap comprising:
a cross-woven material portion, cross-laminate material portion or mesh material portion in a first direction and in a second direction, the material in the first direction comprising a polyolefin, polyester, nylon, yarn or combinations thereof, the material in the second direction comprising a polyolefin, polyester, nylon, yarn or combinations thereof, the first direction being roughly perpendicular to the second direction, the cross-woven material portion, cross-laminate material portion or mesh material portion being adapted to facilitate a drainage path, at least one of the materials in the first direction and the second direction being yarn, the first direction material having a first thickness, the second direction material having a second thickness, the second thickness being at least about 2 times greater than the first thickness so as to assist in providing drainage for moisture build-up; and
a breathable solid layer portion being attached to the cross-woven material portion, cross-laminate material portion or mesh material portion, the breathable solid layer portion being adapted to allow water vapor to flow therethrough in the absence of pinholes or interstices.

18. The protective wrap of claim 17 wherein the yarn is spun yarn, bulk continuous process yarn or natural yarn.

19. The protective wrap of claim 17 wherein the yarn comprises polypropylene, polyethylene or combinations thereof.

20. The protective wrap of claim 17 wherein the breathable solid layer portion is a breathable coating.

21. The protective wrap of claim 20 wherein the breathable coating is polyolefins, polyurethane or nylon.

22. The protective wrap of claim 20 wherein the breathable coating includes a polyolefin and a mineral or inorganic filler.

23. The protective wrap of claim 17 wherein the breathable solid layer portion is a breathable film.

24. The protective wrap of claim 23 wherein the breathable film includes polyolefins, polyurethanes and nylons.

25. The protective wrap of claim 23 wherein the breathable film includes a polyolefin and a mineral or inorganic filler.

26. The protective wrap of claim 1 wherein the breathable solid layer portion is made from an inherently breathable material.

27. The protective wrap of claim 17 wherein the breathable solid layer portion is made from an inherently breathable material.

* * * * *